K. GODDARD.
Axle-Box.
No. 9,023.                                          Patented June 15, 1852.
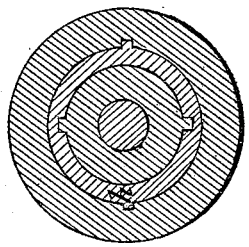
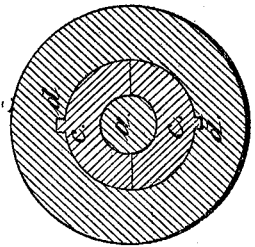
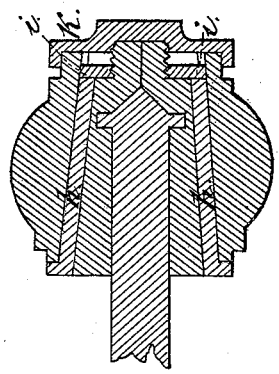
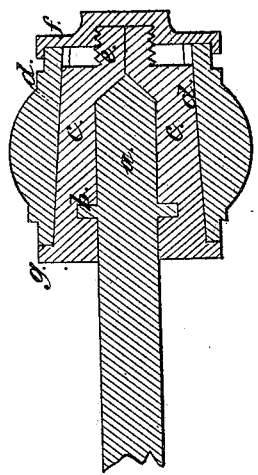
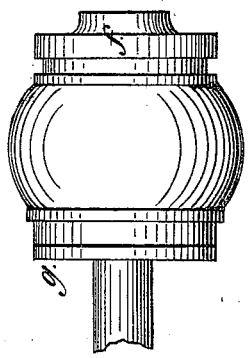

UNITED STATES PATENT OFFICE.

KINGSTON GODDARD, OF PHILADELPHIA, PENNSYLVANIA.

CARRIAGE-AXLE.

Specification of Letters Patent No. 9,023, dated June 15, 1852.

*To all whom it may concern:*

Be it known that I, KINGSTON GODDARD, of Philadelphia, Pennsylvania, have invented a certain new and useful Improvement in Boxes and Axles for Carriages, whether for pleasure or draft, and that the following is a full, clear, and exact description thereof, reference being had to the accompanying drawings, making part of this specification, in which—

Figure 1, is an elevation of a hub on its axle; Figs. 2 and 3, cross and longitudinal sections thereof; and Figs. 4 and 5, like sections of a modification of the mode of construction.

The same letters indicate like parts in all the figures.

The nature of my invention consists in making the box in two or more parts with a recess to receive and embrace a collar on the journal parts of the axle, or what is essentially the same with the projecting fillet to fit into a recess in the journal part of the axle when this is combined with the mode of securing and holding the said box on the axle by making its periphery conical, to fit and be drawn into the hub or into a pipe box fitted to the hub so that by simply securing the said box within the hub or pipe box the axle is at the same time secured within the box.

In the accompanying drawings $a$ represents the journal part of the axle which may be cylindrical or slightly conical, and formed with a collar $b$; and with a conical point if desired. The box $c$ is made in two parts (more than two parts if desired). The two or more parts are put together and bored out accurately to fit the journal part of the axle and with a groove or recess to receive the collar. The exterior of this box is conical and fitted accurately to the inside of the hub with feathers $d$, $d$, fitted to grooves in the hub to prevent it from turning. The outer end $e$, beyond the bore is reduced in diameter and threaded to receive a capnut $f$, by means of which the box is drawn tight within the hub and there secured, the said nut at the same time forming a cap for the outer end of the hub. If desired the sectional box can be made with a collar or shoulder $g$, on the inner end, to fit against the inner end of the hub or be embedded therein. In this mode of construction the collar on the axle running in a groove near the inner end, or the equivalent thereof the axle being grooved to receive a fillet made in the box, will have the effect to retain the oil within the box, while at the same time it will effectually keep the box on the axle, and prevent the accidents which arise from the use of the modes of attachment heretofore employed, which, being connected with the hub that turns and the axle that is stationary are necessarily liable to become disconnected.

Instead of having the collar near the inner end of the journal which would be somewhat difficult to forge, and add to the expense, or making a groove in the journal to receive the fillet in the box, which would weaken the journal I propose to make the collar on the end of the journal as represented in Figs. 4 and 5, as this can be readily formed by simply upsetting the end of the iron in forging. And instead of fitting the box directly to the hub I propose fitting it to the inner end of a metal pipe box $h$, and securing it thereto by a nut $i$, and then fitting the pipe box to the inside of the hub by means of a cap nut $k$, or by any other suitable means. The form of the pipe box and the manner of securing it within the hub may be varied at pleasure. Nor do I wish to confine myself to the form of the outside of the sectional box, so long as it is firmly held onto the axle by being inserted and secured within the hub or pipe box thereof.

What I do claim as my invention and desire to secure by Letters Patent is,

Making the box in two or more parts with a recess to embrace a collar on the journal part of the axle, or the equivalent thereof, substantially as described, when this is combined with the mode of securing together the sections of the said box by fitting it within the hub or pipe box and securing it therein by a nut which embraces the several sections and which secures them within the hub or pipe box, substantially as specified.

KINGSTON GODDARD.

Witnesses:
JOHN THOMPSON,
F. P. DIMPFELY.